United States Patent
Arvidsson (10) Patent No.: US 11,628,738 B2
(45) Date of Patent: Apr. 18, 2023

(54) CHARGING AN ELECTRIC VEHICLE

(71) Applicant: Volvo Car Corporation, Gothenburg (SE)

(72) Inventor: Rickard Arvidsson, Ödsmål (SE)

(73) Assignee: Volvo Car Corporation, Gothenburg (SE)

( * ) Notice: Subject to any disclaimer, the term of this patent is extended or adjusted under 35 U.S.C. 154(b) by 371 days.

(21) Appl. No.: 16/854,734

(22) Filed: Apr. 21, 2020

(65) Prior Publication Data

US 2020/0339003 A1 Oct. 29, 2020

(30) Foreign Application Priority Data

Apr. 24, 2019 (EP) .................................... 19170830

(51) Int. Cl.
| | | |
|---|---|---|
| *B60L 53/65* | (2019.01) | |
| *B60L 53/30* | (2019.01) | |
| *B60L 53/66* | (2019.01) | |
| *B60L 53/18* | (2019.01) | |

(52) U.S. Cl.
CPC ............... *B60L 53/65* (2019.02); *B60L 53/18* (2019.02); *B60L 53/305* (2019.02); *B60L 53/665* (2019.02)

(58) Field of Classification Search
CPC ........ B60L 53/65; B60L 53/18; B60L 53/305; B60L 53/665; B60L 53/66; B60L 53/68; Y02T 10/70; Y02T 10/7072; Y02T 90/12; Y02T 90/14; Y02T 90/16; Y02T 90/167; Y02T 90/169; Y04S 30/14
USPC ......................................................... 701/22
See application file for complete search history.

(56) References Cited

U.S. PATENT DOCUMENTS

| | | | |
|---|---|---|---|
| 8,900,006 B2 | 12/2014 | Gaul et al. | |
| 2010/0161469 A1 | 6/2010 | Littrell | |
| 2012/0109798 A1* | 5/2012 | Shelton | B60L 55/00 |
| | | | 705/30 |
| 2014/0191030 A1* | 7/2014 | Reineccius | G06K 19/07758 |
| | | | 235/492 |
| 2014/0325218 A1 | 10/2014 | Shimizu et al. | |
| 2016/0075249 A1 | 3/2016 | Grabar et al. | |
| 2018/0009325 A1 | 1/2018 | Jang et al. | |
| 2019/0248250 A1 | 8/2019 | Lyutskanov et al. | |

FOREIGN PATENT DOCUMENTS

| | | |
|---|---|---|
| CN | 201210314 Y | 3/2009 |
| EP | 2326529 B1 | 12/2013 |
| WO | 2018077749 A1 | 5/2018 |

OTHER PUBLICATIONS

Extended European Search Report of European Application No. 19170830.4 dated Sep. 25, 2019, 6 pp.

* cited by examiner

*Primary Examiner* — Richard Tan
(74) *Attorney, Agent, or Firm* — Shumaker & Sieffert, P.A.

(57) ABSTRACT

In an aspect, upon a user connecting a charging cable connector of a charging station to a vehicle charging connector of her vehicle, the vehicle will via wireless communication acquire an identifier of the charging station operator, which is transmitted to a server of for instance a car manufacturer. The car manufacturer server can identify the charging station operator from the identifier and register charging session information such that a particular subscription associated with the vehicle or user is charged for the battery charging session and that the charging station operator is duly remunerated.

16 Claims, 8 Drawing Sheets

Fig. 8

CHARGING AN ELECTRIC VEHICLE

CROSS REFERENCE

This application claims the benefit of European Application No. 19170830.4, filed Apr. 24, 2019, the entire contents of which are hereby incorporated by reference.

TECHNICAL FIELD

The present disclosure relates to a method of enabling charging of an electric vehicle at a vehicle charging station, and a device performing the method.

BACKGROUND

The number of electric vehicles manufactured and sold are rapidly increasing. These electric vehicles, for instance electric cars, trucks or motorcycles, occasionally need to be charged at a vehicle charging station.

However, in order to utilize a vehicle charging station, a user of the vehicle needs to be registered at an operator of the vehicle charging station and present e.g. a credit card or a dongle to the vehicle charging station in order to start a charging session.

In a metropolitan area, a great number of operators may host vehicle charging stations, and a user is either obliged to use a vehicle charging station of an operator with which she is registered, or perform further registrations with one or more new operators.

This is a tedious process which is not user-friendly and may consequently hamper users from buying electric cars. Such a scenario is highly undesirable from an environmental and sustainability perspective. Hence, this process needs to be improved.

SUMMARY

An objective is thus to solve, or at least mitigate, this problem in the art and provide an improved method of enabling charging of an electric vehicle at a vehicle charging station.

In an aspect, upon a user connecting a charging cable connector of a charging station to a vehicle charging connector of her vehicle, the vehicle will via wireless communication acquire an identifier of the charging station operator, which is transmitted to a server of for instance a car manufacturer. The car manufacturer server can identify the charging station operator from the identifier and register charging session information such that a particular subscription associated with the vehicle or user is charged for the battery charging session and that the charging station operator is duly remunerated.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain examples of the disclosure are shown.

These aspects may, however, be embodied in many different forms and should not be construed as limiting; rather, these embodiments are provided by way of example so that this disclosure will be thorough and complete, and to fully convey the scope of all aspects to those skilled in the art. Like numbers refer to like elements throughout the description.

Figure 1:
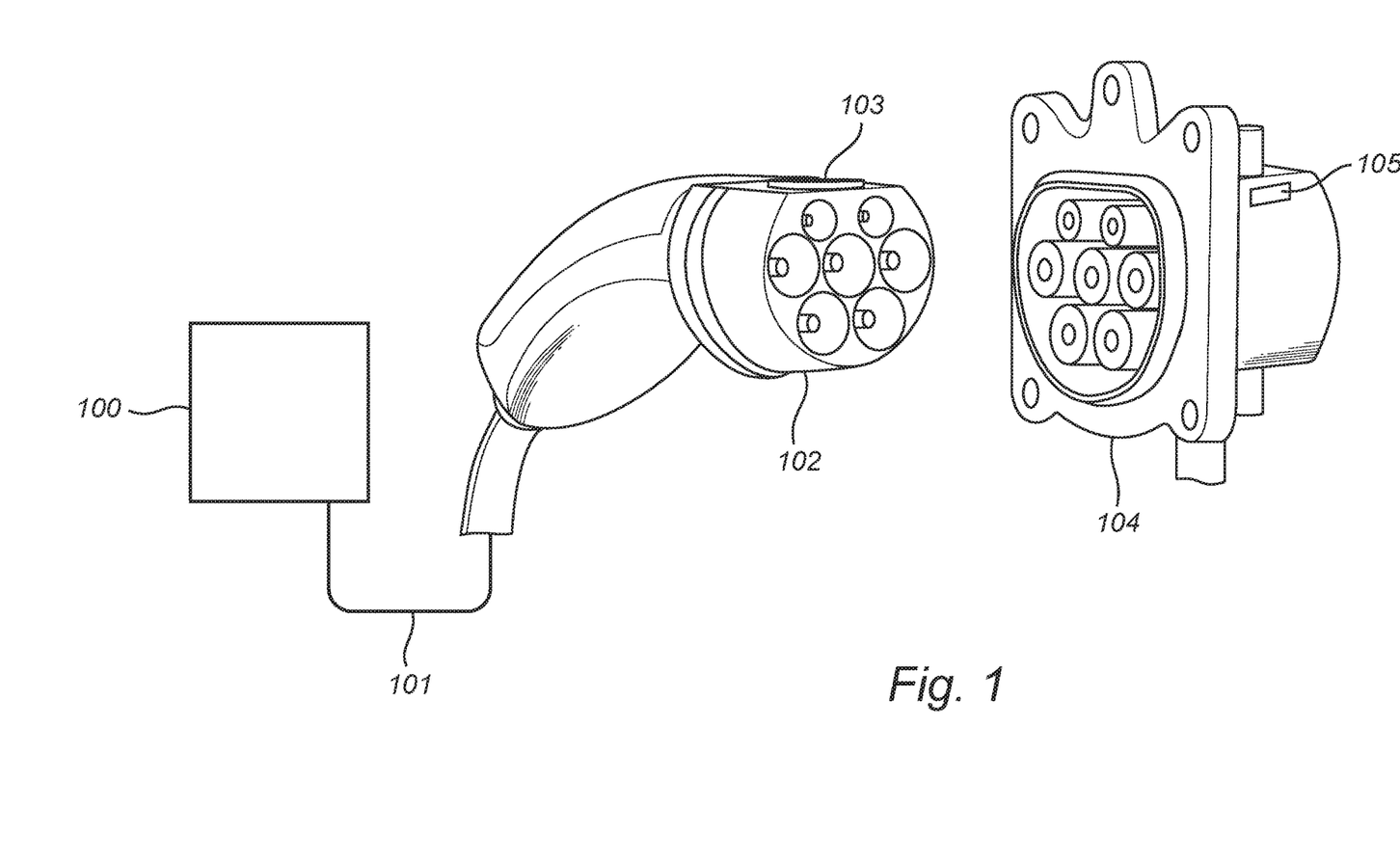
FIG. 1 briefly illustrates charging of an electric vehicle at a charging station according to an embodiment.

FIG. 1 briefly illustrates a charging station 100 for charging a battery of an electric motor (or hybrid) vehicle according to an embodiment. The charging station 100 comprises a charging cable 101 and a charging cable connector 102 equipped with a transmitting device 103 for enabling wireless transmission of an identifier of the charging station 100 (referred to in the following as a CSID). The transmitting device 103 enabling wireless transmission of the CSID may be embodied in the form of a transmitter of wireless signals utilizing near-field communication (NFC) technology such as radio-frequency identification (RFID), Bluetooth Low Energy (BLE), infrared, ultrasound, video using Quick Response (QR) code, etc. In the following, the transmitting device 103 will be exemplified in the form of an RFID tag.

When a user wishes to charge her vehicle, she connects the charging cable connector 102 of the charging station 100 to a vehicle charging connector 104 of her vehicle, which also may be equipped with a transmitting device 105 for enabling wireless transmission between the vehicle and the charging cable connector 102, wherein the charging station 100 will supply energy to the battery of the electric/hybrid vehicle. The transmitting device 105 will in the following be exemplified in the form of an RFID tag.

Figure 2:
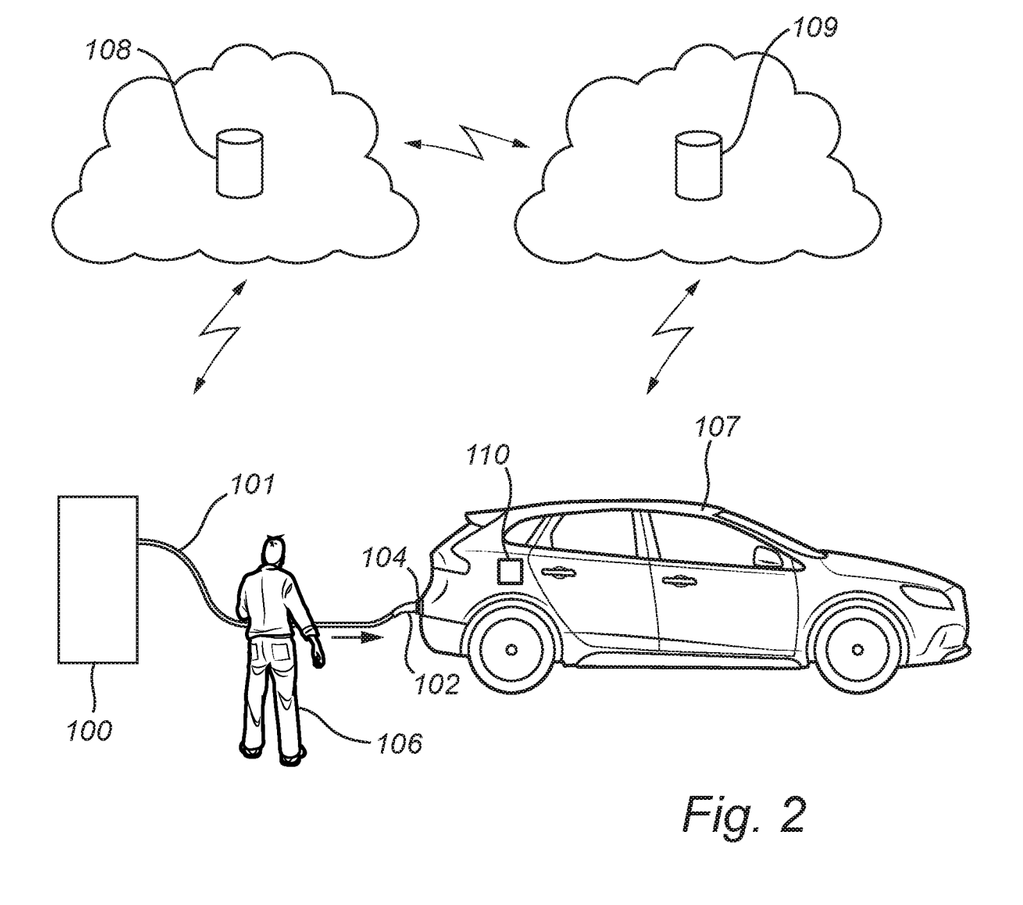
FIG. 2 illustrates in more detail charging of an electric vehicle at a charging station according to an embodiment.

FIG. 2 illustrates a user 106 charging her electric/hybrid car 107 by connecting the charging cable connector 102 attached to the charging cable 101 of the charging station 100 to the vehicle charging connector 104 of her car 107 whereupon charging of the battery of the car 107 may commence. Further shown in FIG. 2 is a server 108 hosted by a charging station operator with which the charging station 100 is capable of wirelessly communicating. Also shown in FIG. 2 is a server 109 hosted by a manufacturer of the car 107 with which the car is capable of wirelessly communicating.

The car 107 is typically equipped with an Electronic Control Unit (ECU, 110), which may be implemented by one or more microprocessors executing appropriate software for controlling various systems and components in the vehicle. A car may contain a great number of interconnected ECUs for controlling all properties of the car such as a brake control module (BCM) or a speed control module (SCM). The ECU 110 typically performs the wireless communication with the server 109 of the car manufacturer.

Figure 3:
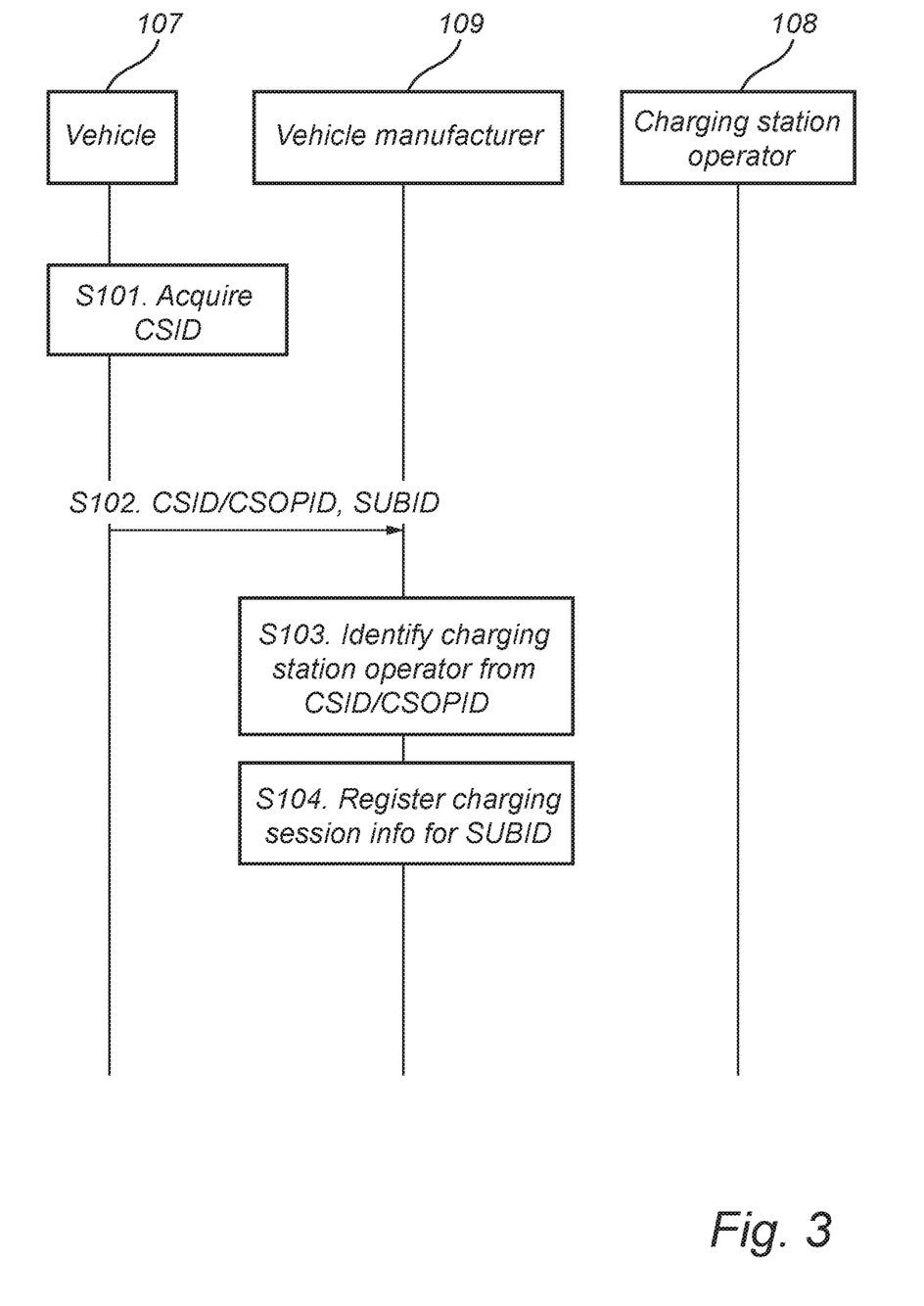
FIG. 3 shows a signalling diagram illustrating a method of enabling charging of an electric vehicle according to an embodiment.

FIG. 3 shows a signalling diagram illustrating a method of enabling charging of an electric vehicle according to an embodiment. Reference will further be made to FIGS. 1 and 2.

In a first step S101, upon the user 106 connecting the charging cable connector 102 to the vehicle charging connector 104 of her car 107, the car 107 will acquire the CSID, possibly by having the RFID tag 103 of the charging cable connector 102 transfer the CSID to the RFID tag 105 of the car 107 and further on the ECU 110. Alternatively, as will be discussed an identifier of the charging station operator, referred to as CSOPID, is acquired.

In step S102, the ECU 110 of the car 107 transmits the CSID to the car manufacturer server 109 via the air interface. Further a charging session subscription identifier (SUBID) is transmitted from the ECU 107 to the car manufacturer server 109 in step S102 thereby enabling the car manufacturer server 109 to associate the battery charging session to be established with a particular subscription managed by the car manufacturer server 109.

The SUBID may be associated for instance with a particular user or vehicle, or even with a car rental agency or a car pool operator. For instance, the user 106 may wish to be able to charge a battery of any one of a plurality of vehicles using her individual subscription managed by the car manufacturer server 109, or the subscription may be valid for a particular vehicle where any family member may charge the battery utilizing the subscription managed by the car manufacturer.

Alternatively, the user 106 may be member of a car pool, wherein the subscription is associated with the car pool operator which will be charged by the car manufacturer and subsequently invoice the user 106. The same procedure may be undertaken by a car rental agency.

Upon receiving the CSID from the ECU 110 in step S102, the car manufacturer server 109 will identify the charging station operator in step S103 by mapping the received CSID to pre-stored information identifying a particular charging station operator in a database, where typically a plurality of charging station operators have a great number of CSIDs registered as illustrated in Table 1 below.

TABLE 1

Charging station operators and associated CSIDs.

| Charging Station Operator | Associated CSIDs |
|---|---|
| A | 1-100 |
| B | 101-160 |
| C | 161-220 |
| D | 221-300 |

Hence, as illustrated in Table 1, CSIDs 1-100 are associated with charging station operator A, CSIDs 101-160 are associated with charging station operator B, and so on.

Now, assuming that the car manufacturer server 109 receives CSID=89 in step S102, the server 109 performs a look-up in the database in step S103 and concludes that this particular CSID is associated with charging station operator A.

Finally, the car manufacturer server 109 registers charging session information in step S104 such that the particular subscription associated with the received SUBID is charged for the battery charging session and that the charging station operator associated with the CSID is duly remunerated. Hence, the charging session information will at least comprise information identifying the subscription and the charging station operator for any charging session.

It is understood that the car manufacturer server 109 may assign and store an identifier, such as numeral, for any battery charging session. The charging session identifier may be associated with the time at which the session started, in case the car manufacturer server 109 stores a plurality of different charging session information sets for a particular subscription.

The car manufacturer server 109 can thus start a battery charging session and can subsequently charge any cost to the subscription identified by means of the received SUBID. Further, since the car manufacturer server 109 also receives the CSID, it can effect the payment for the battery charging to charging station operator A.

Again with reference to FIG. 3, in an alternative embodiment, in the first step S101, upon the user 106 connecting the charging cable connector 102 to the vehicle charging connector 104 of her car 107, the car 107 will acquire an identifier of the charging station operator, referred to as CSOPID, possibly by having the RFID tag 103 of the charging cable connector 102 transfer the CSOPID to the RFID tag 105 of the car 107 and further on the ECU 110.

In step S102, the ECU 110 of the car 107 transmits the CSOPID to the car manufacturer server 109 via the air interface as well as the SUBID.

In this embodiment, the car manufacturer server 109 can directly identify the charging station operator from the CSOPID without using the look-up table illustrated in Table 1, and finally registers charging session information in step S104 such that the particular subscription associated with the received SUBID is charged for the battery charging session and that the charging station operator associated with the CSOPID is duly remunerated.

Figure 4:
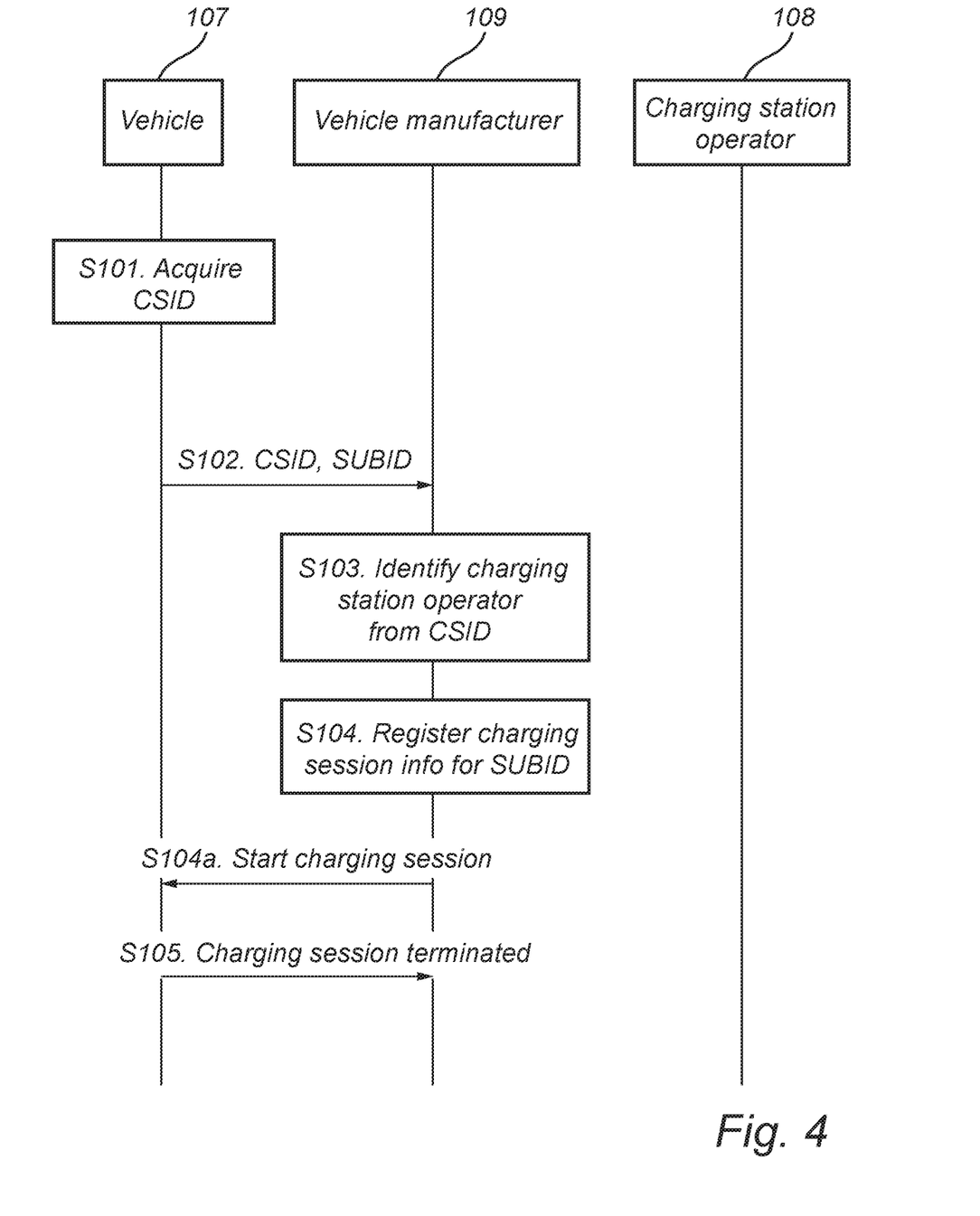
FIG. 4 shows a signalling diagram illustrating a method of enabling charging of an electric vehicle according to an embodiment.

With reference to FIG. 4; in an embodiment, if either the battery is fully charged or the battery charging session is terminated by the user 106 disconnecting the charging cable connector 102 from the vehicle charging connector 104, the ECU 110 sends a message to the car manufacturer server 109 accordingly that the battery charging session is terminated in step S105, wherein the car manufacturer server 109 computes the amount of energy supplied to the battery from the charging station 100 consumed by the car (or receives an indication of the supplied amount of energy from the ECU 110).

Optionally, the car manufacturer server 109 may instruct the vehicle 107 (i.e. the ECU 110) in step S104a to start the charging session after vehicle charging session information has been registered in step S104. Hence, the car 107 is in this embodiment not allowed to start the charging until having been instructed to do so by the car manufacturer server 109.

Figure 5:
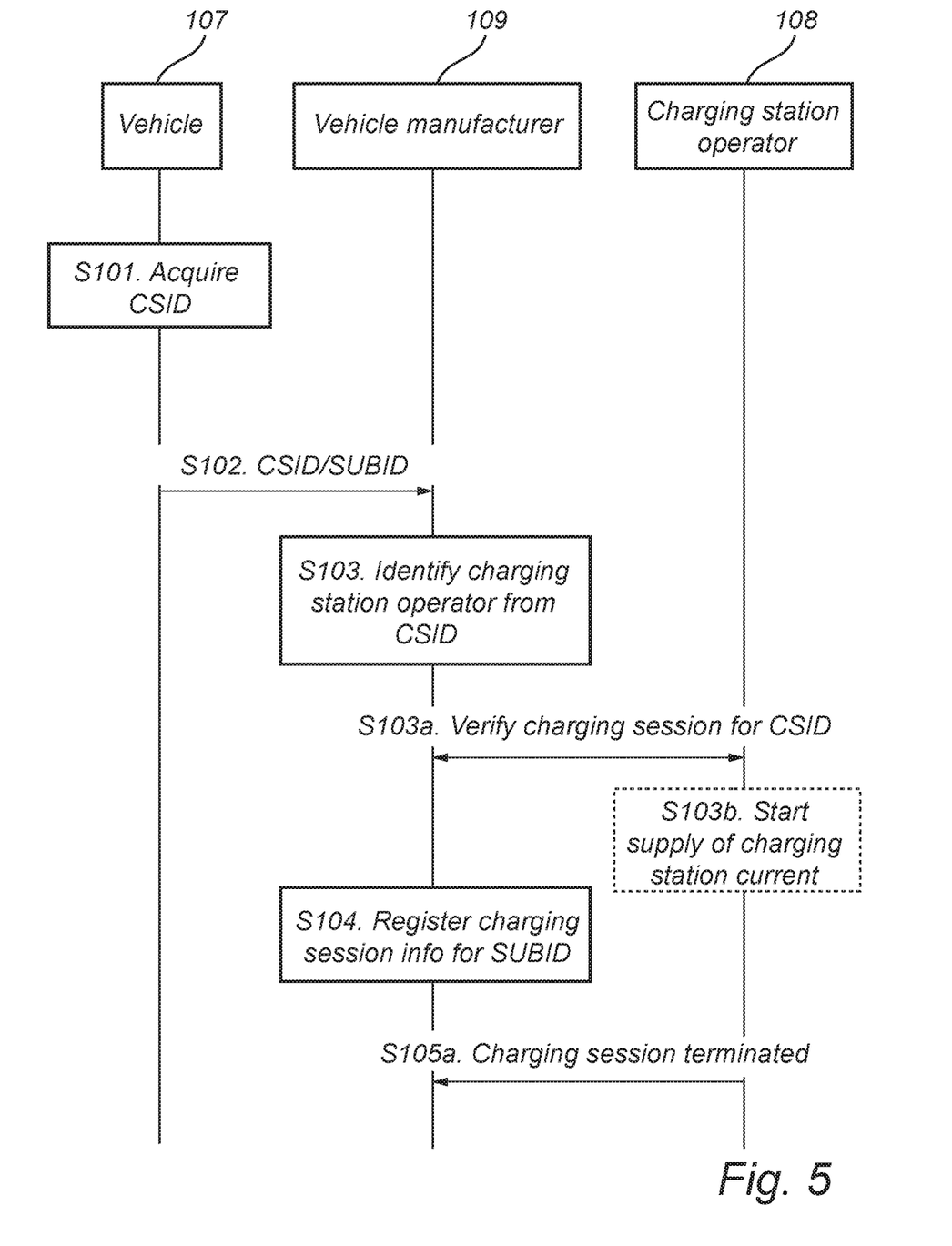
FIG. 5 shows a signalling diagram illustrating a method of enabling charging of an electric vehicle according to an embodiment.

FIG. 5 illustrates yet an embodiment, where the car manufacturer server 109 establishes communication with the server 108 of charging station operator A in step S103a and verifies that a battery charging session can commence for the received CSID.

It should be understood that the charging station 100 may acquire the SUBID of the user 106/vehicle 107 (or car pool operator/car rental agency), for example by receiving the SUBID from the RFID tag 105 of the vehicle charging connector via the RFID tag 103 of the charging cable connector 102.

Hence, the server 108 of the charging station operator may verify that the charging cable connector 103 of the charging station 100 identified by the CSID indeed has been plugged into a vehicle charging connector 104, and further that the subscription for which the battery charging session is to be initiated is the subscription identified by the acquired SUBID.

If so, the car manufacturer server 109 registers the charging session information in step S104 as previously described. In this embodiment, it is envisaged that in step S105a, the charging station operator will indicate the amount of energy supplied by the charging station 100 during the charging session.

It should be understood that the car manufacturer server 109 not necessarily receives information regarding amount of energy consumed by the car 107 during a battery charging session; it may be envisaged that the car manufacturer server 109 sends the charging session information to the server 108 of the charging station operator, which may return either the information indicating amount of energy consumed or even information indicating the amount to be billed to the user 106.

In an embodiment, it is envisaged that after the CSID and possibly also the SUBID has been verified in step S103a, the server 108 of the charging station operator sends a message to the charging station 100 to start supplying current to the vehicle 107 in step S103b. Hence, unless the verification is successful, i.e. that the CSIDs and possibly also the SUBIDs match, it is not possible the charge the car battery since no charging current will be provided by the charging station 100. Further, the ECU 110 may determine whether or not charging is to commence at all.

Advantageously, with the embodiments described, it is not necessary for the user 106 to register which each single charging station operator, the services of which the user 106 wishes to utilize, as in the art. To the contrary, the user 106 (or car pool operator/car rental agency) only needs to register a subscription with the car manufacturer, or with another appropriate party representing the car manufacturer.

Figure 6:
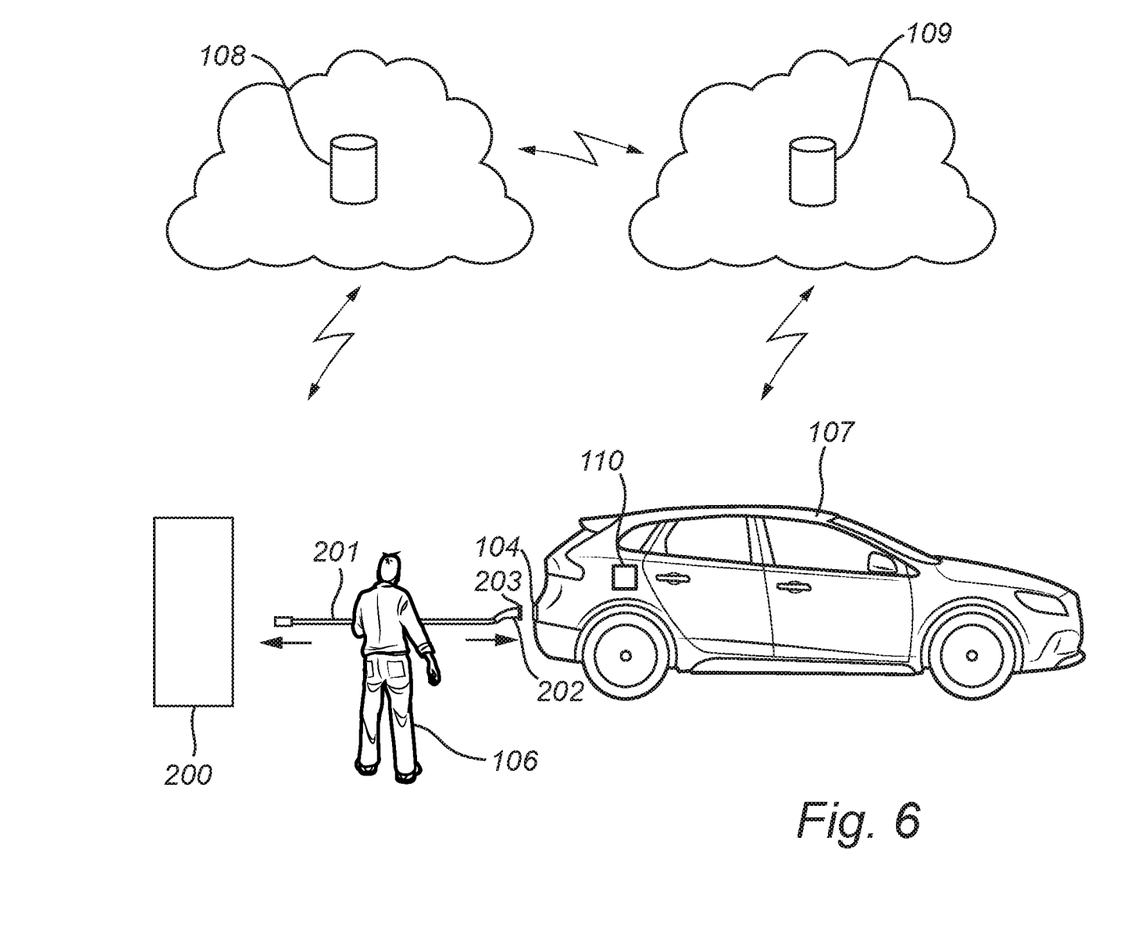
FIG. 6 illustrates charging of an electric vehicle at a charging station according to an embodiment.

FIG. 6 illustrates a further embodiment where the user 106 herself is equipped with a portable charging cable 201 adapted to be connected in one end to a charging station 200 and in the other end via a charging cable connector 202 of the portable charging cable 201 to the vehicle charging connector 104 of the car 107. The portable charging cable 201 may advantageously be used with any appropriate vehicle and charging station.

As previously, the portable charging cable 201 is equipped with a transmitting device 203, exemplified by an RFID tag, for enabling wireless transmission of an identifier.

However, in this embodiment, the identifier to be transmitted by the RFID tag 203 is an identifier of the portable charging cable 201, in the following referred to as a CCID.

As in the embodiment previously described with reference to FIG. 3 where a charging station operator identifier CSOPID is utilized, the CSOPID may be acquired.

Again with reference to FIG. 3, with the portable charging cable 201, the user 106 "swipes" the RFID tag 203 of the portable charging cable 201 over an RFID tag (not shown) of the charging station 200, wherein the RFID tag 203 reads the CSOPID. Thereafter, the user 106 connects the portable charging cable 201 to the charging station 200 and to the car 107, wherein the car 107 acquires the CSOPID from the RFID tag 203 of the portable charging cable 201 in step S101.

In step S102, the ECU 110 of the car 107 transmits the CSOPID to the car manufacturer server 109 via the air interface as well as the CCID.

In this embodiment, similar to the previous, the car manufacturer server 109 can directly identify the charging station operator from the CSOPID without using the look-up table illustrated in Table 1, and finally registers charging session information in step S104 such that the particular subscription associated with the received CCID is charged for the battery charging session and that the charging station operator associated with the CSOPID is duly remunerated.

As is understood, the steps performed in any one of the embodiments described with reference to FIGS. 3-5 are applicable to the embodiments where the portable charging cable 201 is used.

Figure 7:
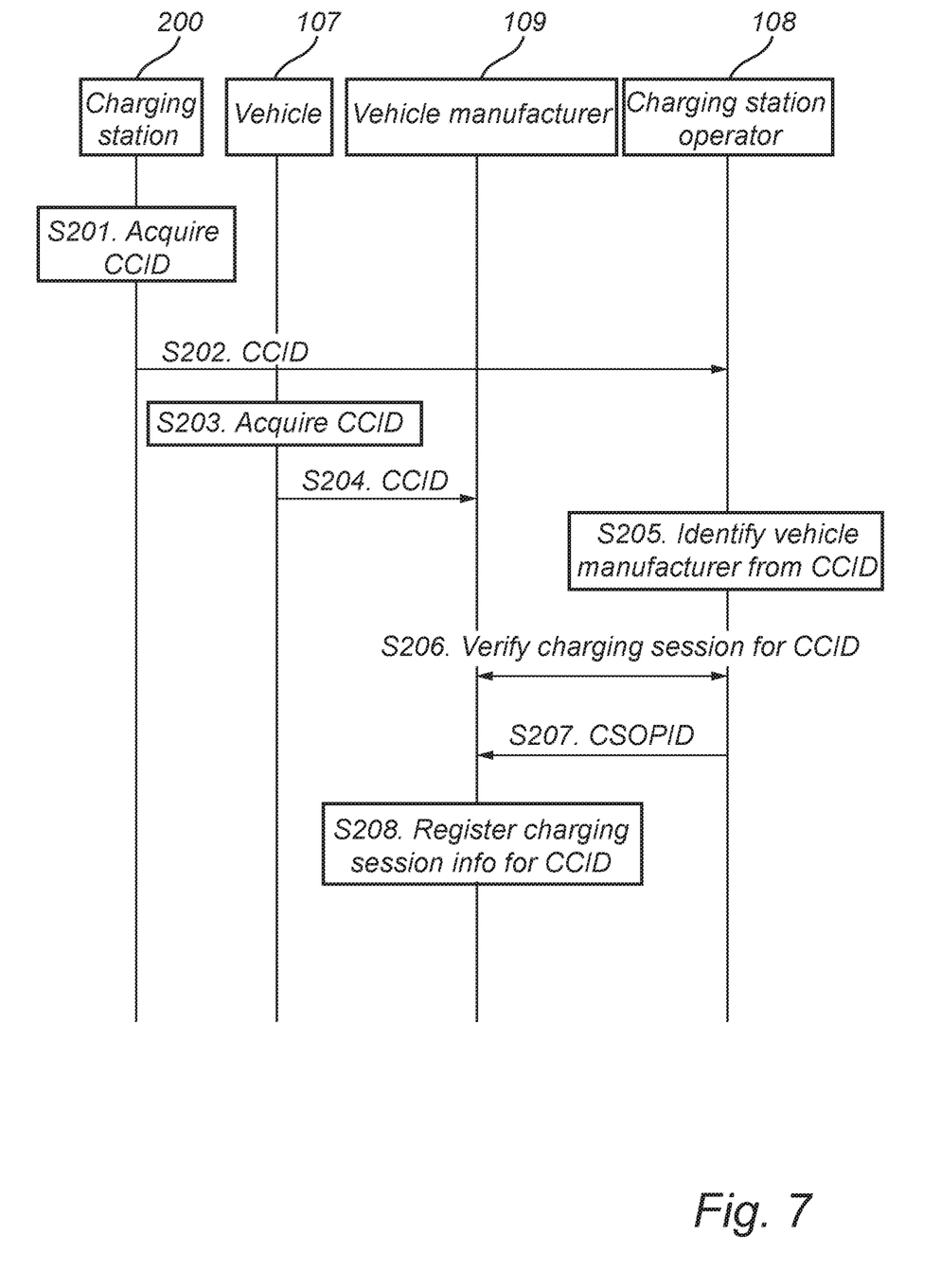
FIG. 7 shows a signalling diagram illustrating a method of enabling charging of an electric vehicle according to an embodiment

FIG. 7 shows a signalling diagram illustrating a method of enabling charging of an electric vehicle according to a further embodiment using the portable charging cable 201 of FIG. 6.

In a first step S201, the user 106 "swipes" the RFID tag 203 of the portable charging cable 201 over an RFID tag (not shown) of the charging station 200, wherein the charging station 200 acquires the CCID and transmits the CCID to the server 108 of the charging station operator in step S202. Thereafter, the user 106 connects the portable charging cable 201 to the charging station 200.

Thereafter in step S203, upon the user 106 connecting the charging cable connector 202 of the portable charging cable 201 to the vehicle charging connector 104 of her car 107, the car 107 acquires the CCID, possibly by having the RFID tag 203 of the charging cable connector 202 transfer the CCID to the RFID tag 105 of the car 107 and further on to the ECU 110.

In step S204, the ECU 110 of the car 107 transmits the CCID to the car manufacturer server 109 via the air interface.

As in the case of the previously described SUBID, the CCID enables the car manufacturer server 109 to associate the battery charging session to be established with a particular subscription managed by the car manufacturer server 109.

Further similar to the SUBID, the CCID may be associated for instance with a particular user, a car or even with a car rental agency or a car pool operator. For instance, the user 106 may wish to be able to charge a battery of any one of a plurality of vehicles using her individual subscription managed by the car manufacturer server 109 (and associated with the portable charging cable 201 by means of the CCID). The user 106 may thus easily move the portable charging cable 201 from one car to another.

Alternatively, the user 106 may be member of a car pool, wherein the subscription identified by the CCID is associated with the car pool operator which will be charged by the car manufacturer and subsequently invoice the user 106. The same procedure may be undertaken by a car rental agency.

Upon receiving the CCID from the charging station 200 in step S202, the server 108 of the charging station operator will identify the car manufacturer in step S205 by mapping the received CCID to pre-stored information identifying a particular car manufacturer in a database, where typically a plurality of car manufacturers have a great number of CCIDs registered as illustrated in Table 2 below.

TABLE 2

Car manufacturers and associated CCIDs.

| Car Manufacturer | Associated CCIDs |
|---|---|
| A | 1-10000 |
| B | 10001-16000 |
| C | 16001-22000 |
| D | 22001-30000 |

Hence, as illustrated in Table 2, CCIDs 1-10000 are associated with car manufacturer A, CCIDs 10001-16000 are associated car manufacturer B, and so on.

Now, assuming that the server 108 of the charging station receives CCID=3042 in step S202, the server 108 performs a look-up in the database in step S205 and concludes that this particular CCID is associated with car manufacturer A.

The server 108 of the charging station operator and the car manufacturer server 109 verifies in step S206 that both servers have received the same CCID.

Finally, if the verification in step S206 is successful, the car manufacturer server 109 receives the CSOPID of the charging station operator from the server 108 of the charging station operator in step S207 and registers charging session information in step S208 such that the particular subscription associated with the received CCID of the portable charging cable 201 is charged for the battery charging session and that the charging station operator associated with the received CSOPID is duly remunerated.

The car manufacturer server 109 can thus start a battery charging session and can subsequently charge any cost to the subscription identified by means of the received CCID. Further, since the car manufacturer server 109 also receives the CSOPID, it can effect the payment for the battery charging to the correct charging station operator.

In alternative embodiment, in case the verification performed in step S206 is omitted, steps S203 and S204 are not required, and the server 108 of the charging station operator can include the CCID along with the CSOPID in step S207

Advantageously, with the embodiments involving the portable charging cable 201, it is not necessary for the user 106 to register which each single charging station operator, the services of which the user 106 wishes to utilize, as in the art. To the contrary, the user 106 (or car pool operator/car rental agency) only needs to register a subscription with the car manufacturer for the portable charging cable 201 identified by the CCID, or with another appropriate party representing the car manufacturer.

Further, advantageous is that, similar to a credit card, the portable charging cable 201 may be blocked by contacting the car manufacturer in case the portable charging cable 201 would be lost or stolen. The verification in step S206 will thus fail, since the car manufacturer server 109 has blocked the CCID associated with the portable charging cable 201.

Figure 8:
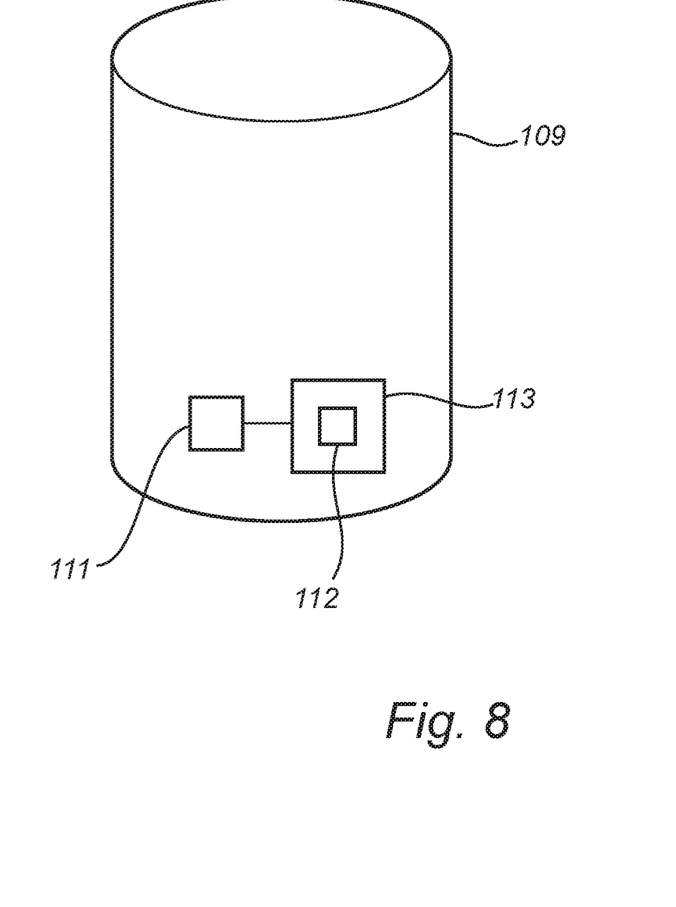
FIG. 8 illustrates a device configured to enable charging of an electric vehicle at a vehicle charging station.

FIG. 8 illustrates a server 109 of the car manufacturer or a party representing the car manufacturer according to an embodiment. The steps of the method of enabling charging of an electric vehicle at a vehicle charging station according to embodiments are in practice performed by a processing unit 111 embodied in the form of one or more microprocessors arranged to execute a computer program 112 downloaded to a suitable storage volatile medium 113 associated with the microprocessor, such as a Random Access Memory (RAM), or a non-volatile storage medium such as a Flash memory or a hard disk drive. The processing unit 111 is arranged to cause the server 108 to carry out the method according to embodiments when the appropriate computer program 112 comprising computer-executable instructions is downloaded to the storage medium 113 and executed by the processing unit 111. The storage medium 113 may also be a computer program product comprising the computer program 112. Alternatively, the computer program 112 may be transferred to the storage medium 113 by means of a suitable computer program product, such as a Digital Versatile Disc (DVD) or a memory stick. As a further alternative, the computer program 112 may be downloaded to the storage medium 113 over a network. The processing unit 111 may alternatively be embodied in the form of a digital signal processor (DSP), an application specific integrated circuit (ASIC), a field-programmable gate array (FPGA), a complex programmable logic device (CPLD), etc.

The aspects of the present disclosure have mainly been described above with reference to a few embodiments. However, as is readily appreciated by a person skilled in the art, other embodiments than the ones disclosed above are equally possible within the scope of the disclosure, as defined by the appended patent claims.

The invention claimed is:

1. A method of a device enabling charging of an electric vehicle at a vehicle charging station comprising:
 receiving, from a vehicle charging station operator, an identifier of a subscription for which a battery charging session is to be established with the vehicle charging station, wherein the vehicle charging station operator has received the identifier of said subscription by the vehicle charging station acquiring the identifier via wireless communication with a portable charging cable being associated with said subscription and being configured to wirelessly communicate said identifier; and
 registering, by a processing unit of said device, battery charging session information for the subscription for which the battery charging session is to be established with the vehicle charging station, the battery charging session information comprising at least the identifier of said subscription and an identifier of the vehicle charging station operator operating the vehicle charging station.

2. The method of claim 1, further comprising:
 receiving the identifier of said subscription from the electric vehicle.

3. The method of claim 1, further comprising:
 receiving the identifier of the vehicle charging station operator operating the vehicle charging station from the electric vehicle, wherein the electric vehicle has acquired the identifier of the vehicle charging station operator via wireless communication with the portable charging cable being configured to wirelessly communicate said identifier.

4. The method of claim 1, further comprising:
 sending an instruction to the electric vehicle to start the battery charging session.

5. The method of claim 1, further comprising:
 receiving a message from the electric vehicle that the battery charging session has been terminated.

6. The method of claim 1, further comprising:
 verifying with the vehicle charging station operator that a battery charging session is to be established with the battery charging station.

7. The method of claim 1, further comprising:
 verifying with the vehicle charging station operator that the vehicle charging station operator has access to the identifier of said subscription, and if so
 receiving, from the vehicle charging station operator, said identifier of the vehicle charging station operator.

8. The method of claim 1, further comprising:
receiving the identifier of the vehicle charging station; and
identifying the vehicle charging station operator by comparing the received identifier with prestored identifiers associated with the vehicle charging station operator.

9. A device configured to enable charging of an electric vehicle at a vehicle charging station, the device comprising a processing unit and a memory, said memory containing instructions executable by said processing unit, whereby the device is operative to:
receive, from a vehicle charging station operator, an identifier of a subscription for which a battery charging session is to be established with the vehicle charging station, wherein the vehicle charging station operator has received the identifier of said subscription by the vehicle charging station acquiring the identifier via wireless communication with a portable charging cable being associated with said subscription and being configured to wirelessly communicate said identifier, and
register battery charging session information for the subscription for which the battery charging session is to be established with the vehicle charging station, the battery charging session information comprising at least the identifier of said subscription and an identifier of the vehicle charging station operator operating the vehicle charging station.

10. The device of claim 9, wherein the device is further operative to:
receive the identifier of said subscription from the electric vehicle.

11. The device of claim 9, wherein the device is further operative to:
receive the identifier of the vehicle charging station operator operating the vehicle charging station from the electric vehicle, wherein the electric vehicle has acquired the identifier of the vehicle charging station operator via wireless communication with the portable charging cable being configured to wirelessly communicate said identifier.

12. The device of claim 9, wherein the device is further operative to:
send an instruction to the electric vehicle to start the battery charging session; and
receive a message from the electric vehicle that the battery charging session has been terminated.

13. The device of claim 9, wherein the device is further operative to:
verify with the vehicle charging station operator that a battery charging session is to be established with the battery charging station.

14. The device of claim 9, wherein the device is further operative to:
verify with the vehicle charging station operator that the vehicle charging station operator has access to the identifier of said subscription, and if so
receive, from the vehicle charging station operator, said identifier of the vehicle charging station operator.

15. The device of claim 9, wherein the device is further operative to:
receive the identifier of the vehicle charging station; and
identify the vehicle charging station operator by comparing the received identifier with prestored identifiers associated with the vehicle charging station operator.

16. A non-transitory computer readable medium storing instructions that, when executed, cause a processing unit of a device configured to enable charging of an electric vehicle at a vehicle charging station to:
receive, from a vehicle charging station operator, an identifier of a subscription for which a battery charging session is to be established with the vehicle charging station, wherein the vehicle charging station operator has received the identifier of said subscription by the vehicle charging station acquiring the identifier via wireless communication with a portable charging cable being associated with said subscription and being configured to wirelessly communicate said identifier, and
register battery charging session information for the subscription for which the battery charging session is to be established with the vehicle charging station, the battery charging session information comprising at least the identifier of said subscription and an identifier of the vehicle charging station operator operating the vehicle charging station.

* * * * *